Patented Mar. 8, 1938

2,110,208

UNITED STATES PATENT OFFICE 2,110,208

ANTIGEN PREPARATIONS

Floyd H. Eggert, Woodworth, Wis., assignor to U. S. Standard Products Company, Woodworth, Wis., a corporation of Wisconsin No Drawing. Application February 12, 1937, Serial No. 125,479

5 Claims. (Cl. 167—78)

The present invention relates to antigen preparations for hypodermic injection and has particular reference to the combination of specific antigens with milk proteins.

A principal object of the present invention is the preparation of an antigen product in which specific antigens are combined with and carried in a liquid medium having milk proteins therein, this preparation being particularly desirable from the standpoint of hypodermic use. This and other objects will be apparent upon a consideration of the following description of a preferred embodiment of the invention.

In the administration of specific antigens, it is customary to prepare a vaccine from innocuous bacterial suspensions in a physiological salt solution by well known methods. Such antigens are administered hypodermically and stimulate immunity by building up anti-bodies in the blood stream. The degree to which this immunity is stimulated determines the effectiveness of the antigenic preparation. The present invention is based upon the discovery that more satisfactory results may be attained in the administration of practically all known antigens by combining the antigens with milk proteins prior to injection.

The proteins in the milk are carried in colloidal suspension and exist in a highly adsorptive form. For many years milk has been employed as a simple, non-specific protein for parenteral use. In the present instance it has been found that milk constitutes a more satisfactory carrying agent for specific antigens than the physiological salt solutions used heretofore.

In the preparation of the improved material the antigen or antigens to be injected are produced in the customary manner. The culture of bacteria is produced in Blake bottles or the like. After the culture is developed it is washed from the culture medium with a salt solution and the bacteria are killed as by heating or by the use of known bactericidal agents. A bacterial count is made to determine the concentration of the solution.

The milk proteins may be prepared simply by defatting and sterilizing whole milk from which heat coagulable sensitizing proteins which may have a tendency to produce shock reactions have been removed. The resulting product contains a substantial amount of casein. In some cases it will be found desirable to use modified proteins or their derivatives but for most purposes it is satisfactory to employ milk which has been defatted. Fresh whole milk is obtained from tuberculin and blood-tested animals. The milk is drawn through sterile containers and a bacteriostatic agent is added. Thereafter the whole milk is passed through a centrifugal separator for removing the fat portions. The defatted milk may be flasked and heated for 2 hours at 200° F. A further centrifugal step may be employed for removing residual fat portions and heat-coagulated proteins. In many cases the best practice will include the use of a small portion of a preservative such as 0.4 per cent cresol. In the resulting condition the milk containing colloidal casein is ready for admixture with the antigens.

It is possible to utilize the milk to advantage with various types of antigens. For example, the milk may be mixed with specific diphtheria toxins. Tetanus toxins, streptococcus toxins, and the like also may be used to advantage with the milk. Bacterial vaccines including bacterial cell bodies plus specific toxins or toxoids of these organisms may be combined with the milk. Among the cell bodies and their toxins which may be so employed are *Micrococcus catarrhalis*, pneumococcus, *Streptococcus hemolyticus*, *Streptococcus viridans*, *Staphylococcus aureus*, *Staphylococcus albus*, *B. Friedlander*, *B. coli*, gonococcus, *Bacillus influenzae* and pertussis bacillus. In general, I have found that the casein contained in the milk has an affinity for these materials so that when combined the resulting mixture is more desirable from the standpoint of hypodermic administration. Apparently, the milk proteins have an adsorptive effect upon the materials with which they are combined. When administered hypodermically the adsorptive combination of the proteins with the antigens controls the rate of release of the antigens so that a longer period of time is available within which the antigens may stimulate the development of immunity. The combined milk proteins and antigens also tend to reduce the local irritation incident to the injection of the antigens and permits the injection of more of the antigen than normally employed without harm.

Ordinarily, it is desirable initially to incorporate the antigens in physiological salt solution, an amount of the salt solution being used which will give the proper concentration of antigens after the addition of the desired amount of milk. To the concentrated suspension of antigens in physiological salt solution is added a quantity of milk proteins sufficient to make up 60 per cent of the total volume of the mixture. The amount of milk may be varied to a considerable extent, depending upon the nature of the antigens and the results desired. The casein has a particular affinity for the antigen which permits of control of the rate of absorption upon injection, and is superior in many respects to adsorptive products such as aluminum hydroxide used in connection with antigens heretofore.

In many cases it will be found desirable to provide a vaccine containing in the milk menstruum a mixture of antigens, the milk acting as a common carrier for the antigens.

The concentration of antigens in the milk may vary and the amount of the mixture to be used will depend upon the characteristics of the patient and the nature of the immunity to be established. The usual method of subcutaneous injection of a small quantity of the material may be made the basis of determining the increase of dosage.

The milk proteins may be modified to some extent without destroying their adsorptive power with respect to the antigens and such modified products may be used in preparation of hypodermic vaccines in the manner described herein.

For many general infections it will be found desirable to employ a vaccine consisting of a mixture of antigens in a common milk protein medium or the milk may contain various specific bacterial proteins and toxic or toxoided by-products which have a well known immunity-creating effect when administered hypodermically. One suitable antigen preparation and the count thereof consists in the suspension in one cc. of milk menstruum of the following:

|  | Million |
| --- | --- |
| Acne bacillus | 1000 |
| Staphylococcus aureus | 500 |
| Staphylococcus albus | 500 |

The milk proteins are suitable for use in the antigen preparations, the utility of which has been established by years of recognized use. It will be recognized that changes in the particular details of the process and the product described herein for purposes of explanation may be made without departing from the invention as defined in the appended claims.

I claim:

1. A hypodermic preparation of the type described, comprising a specific antigen combined with milk proteins.

2. A hypodermic preparation of the type described, comprising a specific antigen contained in a solution of salt and milk proteins.

3. A hypodermic preparation of the type described, comprising a mixture of specific antigens contained in an aqueous medium containing milk proteins.

4. The method of producing a hypodermic preparation, which comprises forming an innocuous bacterial culture suspension, and adding said culture suspension to an aqueous medium containing milk proteins.

5. The method of producing a hypodermic preparation, which comprises producing a standardized antigen and salt solution, and mixing the same with a quantity of milk protein sufficient to adsorb said antigens.

FLOYD H. EGGERT.